United States Patent [19]

Miyoshi

[11] Patent Number: 4,740,002
[45] Date of Patent: Apr. 26, 1988

[54] FOUR-WHEEL STEERING APPARATUS FOR VEHICLES

[75] Inventor: Akihiko Miyoshi, Hiroshima, Japan

[73] Assignee: Mazda Motor Corporation, Hiroshima, Japan

[21] Appl. No.: 31,842

[22] Filed: Mar. 30, 1987

[30] Foreign Application Priority Data

Mar. 31, 1986 [JP] Japan .................................. 61-72766

[51] Int. Cl.$^4$ .............................................. B62D 7/00
[52] U.S. Cl. ........................................ 280/91; 180/142
[58] Field of Search .......................... 280/91, 99, 707; 180/141, 142

[56] References Cited

U.S. PATENT DOCUMENTS

| | | | |
|---|---|---|---|
| 4,572,316 | 2/1986 | Kanazawa et al. | 280/91 |
| 4,624,476 | 11/1986 | Tanaka et al. | 280/707 |
| 4,669,744 | 6/1987 | Sano et al. | 280/91 |
| 4,679,808 | 7/1987 | Ito et al. | 280/91 |
| 4,690,431 | 9/1987 | Ito et al. | 280/91 |

Primary Examiner—Ross Weaver
Attorney, Agent, or Firm—Wegner & Bretschneider

[57] ABSTRACT

The rear wheels of a vehicle are turned together with the front wheels in response to the operation of a steering wheel. Turning ratio changing means is provided so as to be able to change a turning ratio of the rear wheels to the front wheels. In altering the turning ratio, a speed of changing the turning ratio is designed to get delayed when a road surface is more slidable or slippery, i.e., a road surface friction coefficient $\mu$ is smaller, as compared to when a road surface is less slidable or less slippery, i.e., a road surface friction coefficient $\mu$ is larger.

23 Claims, 16 Drawing Sheets

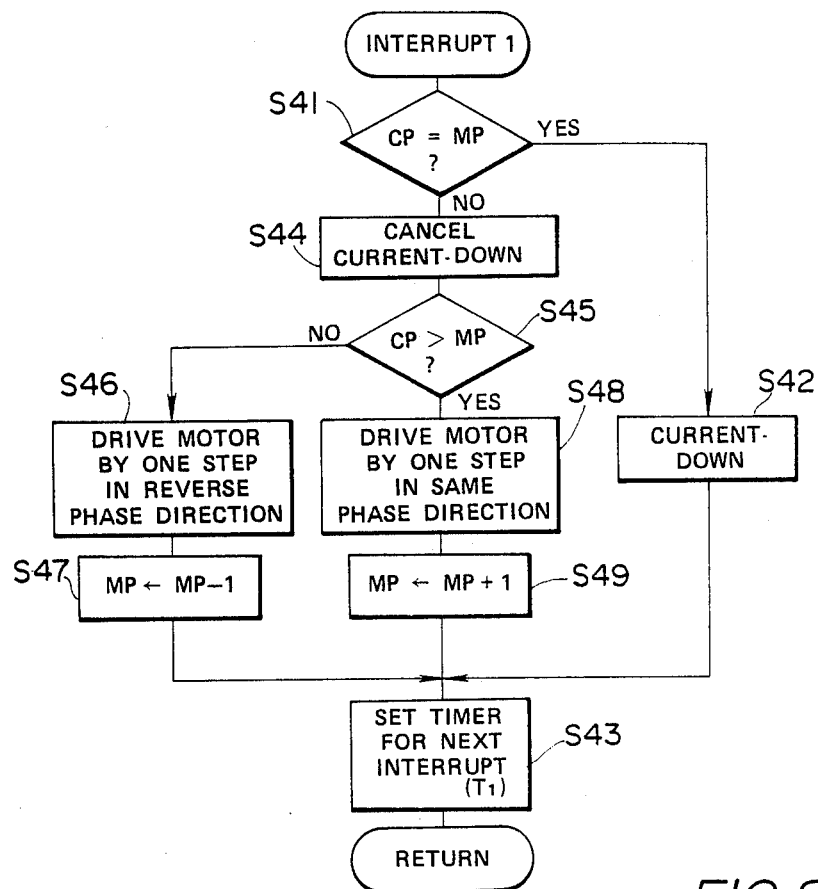
FIG. 6
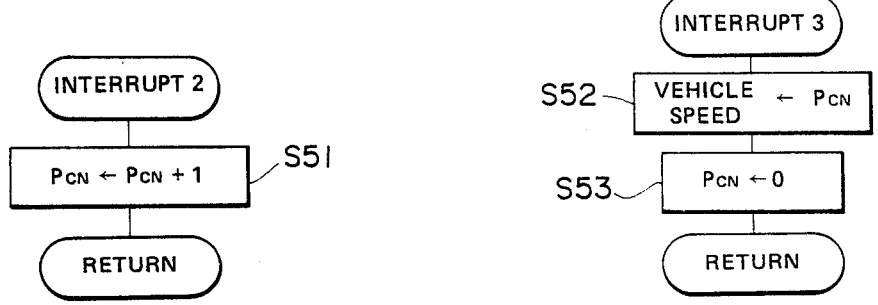
FIG. 7
FIG. 8

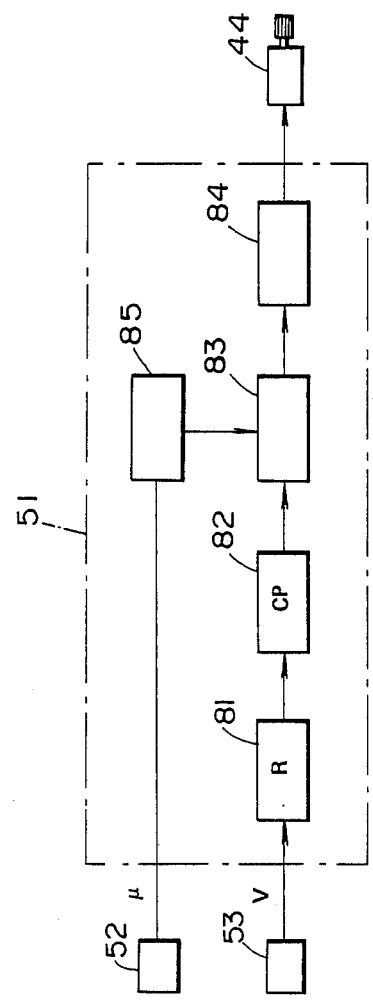
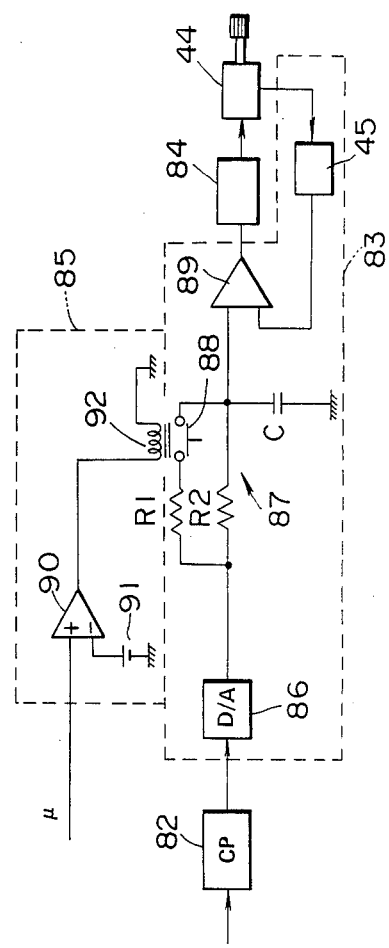

FOUR-WHEEL STEERING APPARATUS FOR VEHICLES

BACKGROUND OF THE INVENTION

1. Field of the Invention

The present invention relates to a four-wheel steering apparatus for vehicles and, more particularly, to a four-wheel steering apparatus for vehicles adapted to change a turning ratio of the rear wheels to the front wheels.

2. Description of the Prior Art

A four-wheel steering apparatus for a vehicle designed to turn the rear wheels in association with the front wheels in response to the operation of a steering wheel by an operator includes a front wheel turning mechanism and a rear wheel turning mechanism, and a steering angle of the steering wheel is arranged so as to be transmitted through the both turning mechanisms to the front wheels and the rear wheels as a turning angle. The steering angle of the steering wheel may be transmitted to the rear wheel turning mechanism by way of various means such as mechanical, electrical, fluid ones or a combination therewith.

In the four-wheel steering apparatus, a turning ratio of the rear wheels to the front wheels (that is, a ratio of a turning angle of the rear wheels to that of the front wheels) is not always constant and is commonly variable on the basis of a predetermined turning ratio characteristics. The turning ratio characteristics is set using a running state of the vehicle as a parameter. The parameters may include, for instance, a vehicle speed, the steering angle of a steering wheel, and a transverse G (an acceleration in the transverse direction) acting on the vehicle. U.S. Pat. No. 4,313,514 discloses the turning ratio characteristics set on the basis of vehicle speeds.

The turning ratio characteristics is not necessarily limited to one kind. A plurality of turning ratio characteristics may be set and one of them may be selected by a manual selection or the like. U.K. Pat. No. 2,152,452 discloses delay means for changing turning ratios gradually in selecting the turning ratio characteristics.

The direction in which the rear wheels are turned may be determined by a so-called same phase direction and a so-called reverse phase direction. The turning in the same phase direction is defined here, on the one hand, as the turning of the rear wheels in the direction identical to the direction in which the front wheels are turned. The turning of the rear wheels in the reverse phase direction is defined here, on the other hand, as the turning of the rear wheels in the direction opposite to the direction in which the front wheels are turned. Accordingly, in instances where a turning ratio is altered from one state to another, a changing direction being in the same phase direction, on the one hand, means that the direction in which the rear wheels are turned approaches to the direction in which the front wheels are turned. For example, where the front wheels are turned left, the rear wheels are also turned in the left-hand direction from the existing position. A changing direction being in the reverse phase direction, on the other, means that the direction in which the rear wheels are turned is parting from the direction in which the front wheels are turned. For instance, where the front wheels are turned left, the rear wheels are turned in the right-hand direction from the existing position. And a direction for changing the turning ratio has nothing to do with an existing state in which the rear wheels are turned, that is, the state in which the turning state is currently in the same phase or in the reverse phase. More specifically, assuming the existing state that the front wheels are turned left while the rear wheels are turned right, the state in which the rear wheels are turned left from the existing state is called an alteration of the turning ratio in the same phase direction and the state in which the rear wheels are turned farther right therefrom is called an alteration of the turning ratio in the reverse phase direction.

Extensive studies have been made to put the four-wheel steering apparatus into practice. As a result, it has been found that a rate of speeds at which the turning ratio is changed lies one of the points for commercialization.

From the point of view, we have already completed the invention as was previously disclosed and claimed in Japanese Patent Application No. 24,059/1986 filed Feb. 7, 1986 corresponding to U.S. patent application Ser. No. (not yet assigned) filed Feb. 4, 1987. This invention is briefly described to be designed so as to make a speed of changing a turning ratio slower when the rear wheel turning ratio is changed in the reverse phase direction than when the rear wheel turning ratio is changed in the same phase direction. More specifically, when the rear wheel turning ratio is changed in the same phase direction, on the one hand, the stability of a vehicle body is enhanced so that the turning ratio is designed to be changed quickly. When the changing direction is in the reverse phase direction, on the other hand, the stability of the vehicle body is redused so that the turning ratio is designed to be changed slowly.

It is, however, to be noted that, when there are seen influences which an alteration of the rear wheel turning ratio affects on the behaviour of a vehicle body, problems that a change in the behavior of a vehicle body offers are not restricted to a change in information that forces the alteration of the rear wheel turning ratios—say, elements such as a vehicle speed or a shift of characteristics. As a result of studies from this point of view, it has now been found that a sliding state of a road surface, i.e., a road surface friction coefficient $\mu$ affects a big influence on a change in the behavier of a vehicle body when the turning ratio is changed. It is thus to be noted that, even if the speeds of changing the turning ratios would be the same, the change in the behavior of the vehicle body becomes relatively larger when a road surface is more slidable or slippery, i.e., when the road surface friction coefficient $\mu$ is smaller, than when the road surface is less slidable or less slippery, i.e., when the road surface friction coefficient $\mu$ is larger.

SUMMARY OF THE INVENTION

The present invention has an object to provide a four-wheel steering apparatus for a vehicle, which is adapted so as to maximize a quickness or a responsiveness of an alteration of the rear wheel turning ratio in response to a sliding state of a road surface and, at the same time, to control the change in the undesirable behavior of a vehicle body.

This object is achieved in accordance with the present invention basically by the arrangement, as described and claimed in claim 1, in which a four-wheel steering apparatus for a vehicle with a front wheels turning mechanism and a rear wheels turning mechanism constructed so as to cause the rear wheels to be turned in association with the front wheels in response to a steering wheel contains turning ratio changing means for changing a turning ratio of the rear wheel to the front wheel; sliding state detecting means for detecting a sliding state of a road surface or a road surface friction coefficient $\mu$; and changing speed altering means for altering the changing speed of turning ratios so as to be delayed when the road surface is more slidable or slippery or when the road surface friction coefficient $\mu$ is smaller than when the road surface is less slidable or less slippery or when the road surface friction coefficient $\mu$ is larger.

Preferred embodiments according to the present invention are constructed in the following manner, as illustrated by a block diagram in FIG. 1.

In accordance with the present invention, a four-wheel steering apparatus for a vehicle with a front wheels turning mechanism and a rear wheels turning mechanism constructed so as to cause the rear wheels to be turned in association with the front wheels in response to a steering wheel contains turning ratio changing means for changing a turning ratio of the rear wheel to the front wheel; memory means for memorizing turning ratio characteristics set in accordance with a running state of the vehicle; running state detecting means for detecting the running state of the vehicle; target turning ratio determining means for determining a target tuning ratio on the basis of the turning ratio characteristics in accordance with the running state of the vehicle; turning ratio change controlling means for controlling the turning ratio changing means so as to become the target turning ratio; sliding state detecting means for detecting a sliding state of a road sruface or a road surface friction coefficient $\mu$; and changing speed altering means for altering the changing speed of turning ratios so as to be delayed when the road surface is more slidable or slippery or when the road surface friction coefficient $\mu$ is smaller than when the road surface is less slidable or less slippery or when the road surface friction coefficient $\mu$ is larger.

As will become apparent from the description below, this construction is particularly suitable for directly controlling the changing of the turning ratio alone regardless of a turning angle of a steering wheel.

As the rear wheel turning mechanism and constructions of parts for changing the turning ratio to be used for the present invention may be used conventional ones of various type.

The present invention is particularly favorable in instances where turning ratio characteristics is set using a vehicle speed as a parameter, but is not limited thereto. Various elements known to the skilled in the art may be used as parameters to set turning ratio characteristics, and the turning ratio characteristics is not limited to one kind and it is possible to use a plurality of turning ratio characteristics in a manner capable of being selected therefrom automatically or by manual operation.

The changing of speeds of changing a turning ratio may be conducted in various manner. For example, a speed itself for operating an actuator for changing turning ratios may be changed. Appropriate delay means may also be conveniently interposed in a control system for changing the rear wheel turning ratio so as to control the operation of the delay means in accordance with the road surface friction coefficient $\mu$.

The speed of changing the rear wheel turning ratios may be designed to be always changed in accordance with the road surface friction coefficient $\mu$. In other words, it may be such that the speed of changing the rear wheel turning ratios becomes always smaller when the road surface friction coefficient $\mu$ is smaller than when the road surface friction coefficient $\mu$ is larger.

Unlike the above arrangements, a maximum value or an upper limit value may be set for the speed of changing the rear wheel turning ratios to be changing in accordance with the road surface friction coefficient $\mu$—say, the maximum value is set so as to become smaller when the road surface friction coefficient $\mu$ is smaller than when the road surface friction coefficient $\mu$ is larger. More specifically, in instances where the rear wheel turning ratio is controlled to provide a desirable value by way of the feedback control system or the open loop control system, it is generally described that the larger a deviation between the actual rear wheel turning ratio and a target rear wheel turning ratio is, the faster the speed of changing the turning ratio. When the rear wheel turning ratio is changed, a rapid change in the behavior of a vehicle body is likely to occur only when the speed of changing the rear wheel turning ratio gets faster than a certain degree. The speed of changing the rear wheel turning ratios that causes the rapid change in the behavior of the vehicle body gets slower as the road surface friction coefficient $\mu$ gets smaller. Accordingly, it is to be noted that the rapid change in the behavior of the vehicle body can be controlled in accordance with the road surface friction coefficient $\mu$ by such an extremely simple procedure as setting a maximum value as described above.

It is to be understood that the control of the speed of changing the rear wheel turning ratios, including the control of the maximum value, may be made in a continuously variable manner. In this case, as a matter of course, it is necessary to detect the road surface friction coefficients $\mu$ continuously.

It is also to be understood that the speed of changing the rear wheel turning ratios may be controlled in a stepwise manner, for example, in two steps. This procedure is advantageous because it is hard to detect the road surface friction coefficients $\mu$ continuously from the practical point of view and the control system is rendered as simple as possible. In particular, the present invention is practically appropriate even if the road surface friction coefficients $\mu$ are roughly divided into two such as, for example, a dry paved road surface and a snow-covered road surface. It is also possible to drive the road surface friction coefficients $\mu$ into multisteps to classify them as a dry paved road surface, a wet road surface, a snow-covered road surface and a frozen road surface, for example.

The road surface friction coefficients $\mu$ may be detected conveniently by a variety of conventional procedures. As a matter of course, it is possible to use a manually operative switch. In this case, the switch may be of the type operative either in a stepwise manner or in a continuous manner.

Other objects and advantages of the present invention will become apparent during a course of the following descriptions.

BRIEF DESCRIPTION OF THE DRAWINGS

FIGS. 5 to 11 are each a flow chart illustrating an example of a control system according to the present invention.

FIGS. 18 to 20 are each a block circuit diagram for a control in accordance with the present invention.

FIGS. 25 to 21 are each a circuit diagram of a specific embodiment for detecting a road surface friction coefficient $\mu$.

DETAILED DESCRIPTION OF THE PREFFERRED EMBODIMENT

Embodiments of the present inveniton will be described more in detail with references to drawings attached hereto.

Figure 1:
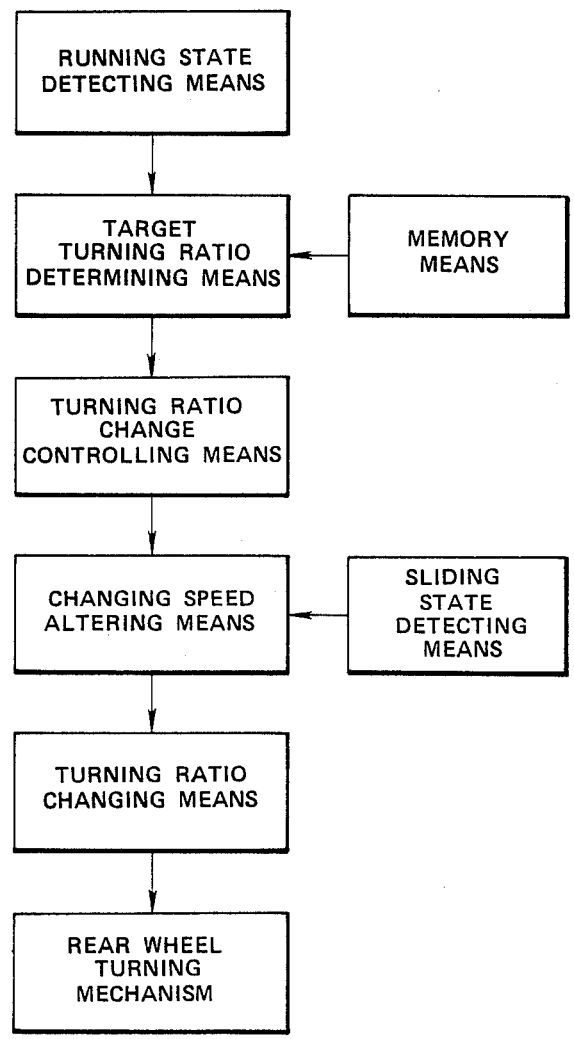
FIG. 1 is a block diagram illustrating a preferred example of constructions according to the present invention.
Figure 2:
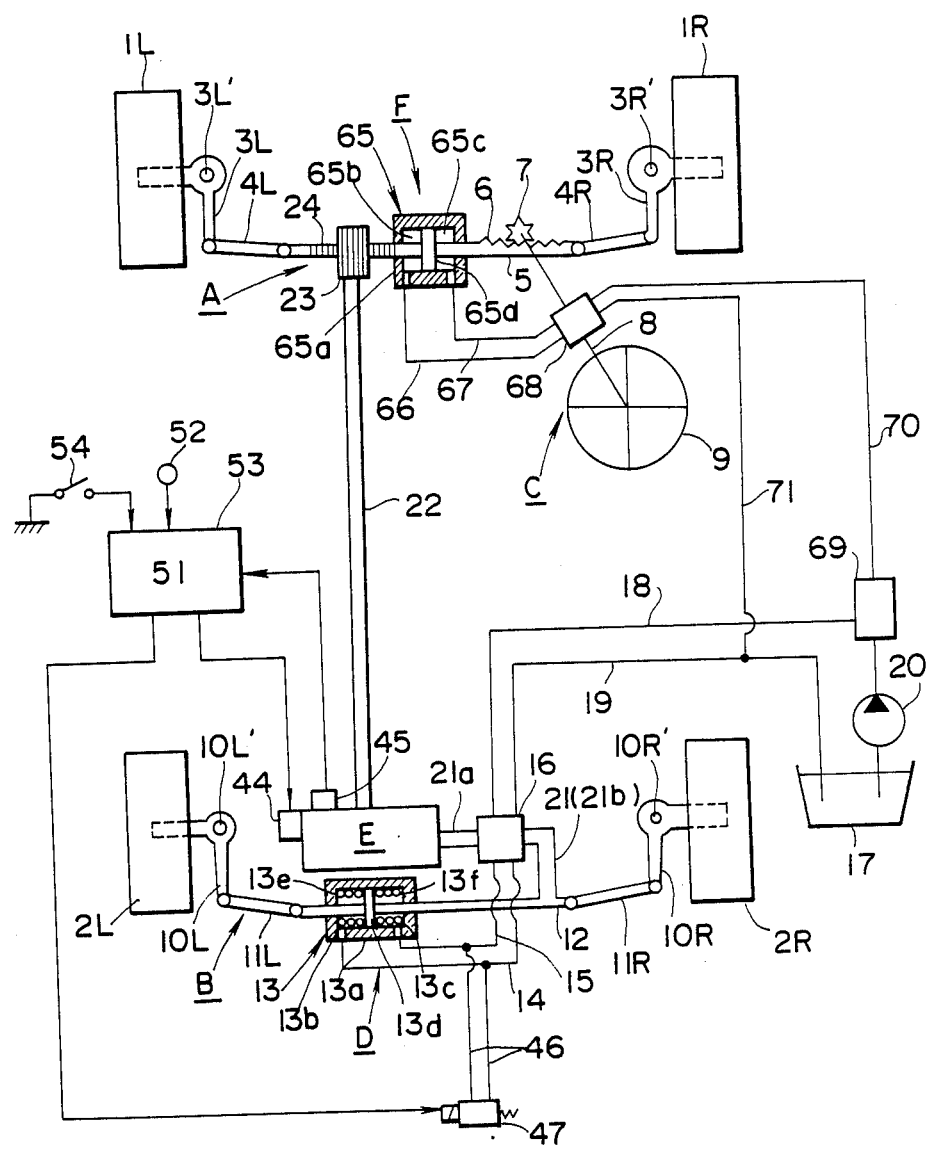
FIG. 2 is a plane view illustrating an embodiment according to the present invention.

In FIG. 2 reference numerals 1R and 1L, denote right and light front wheels, respectively, and reference numerals 2R and 2L denote right and left rear wheels, respectively. The right front wheel 1R and the left front wheel 1L are associated with a front wheel turning mechanism A, and the right rear wheel 2R and the left rear wheel 2L are associated with a rear wheel turning mechanism B.

In the illustrated embodiment, the front wheel turning mechanism A is composed of right and left knuckle arms 3R and 3L, right and left tie rods 4R and 4L, and a relay rod 5 that connects the right and left tie rods 4R and 4L to each other, respectively. The front wheel turning mechanism A is associated with a steering mechanism C that is of a rack-and-pinion type in this particular embodiment. That is, the relay rod 5 is provided with a rack 6 so as to be in mesh with a pinion 7 that in turn is connected through a shaft 8 to a steering wheel 9. When the steering wheel 9 is turned right, on the one hand, the relay rod 5 is moved left in FIG. 2 to clockwisely rotate the right and left knuckle arms 3R and 3L about their respective pivotal centers 3R' and 3L', thereby turning the front wheels in the clockwise direction by an amount corresponding to a turning angle of the steering wheel 9. When the steering wheel 9 is turned left, on the other, the front wheels 1R and 1L are turned in the counterclockwise direction in accordance with an amount corresponding turning angle of the steering wheel in a similar manner.

The rear wheel turning mechanism B is composed of right and left knuckle arms 10R and 10L, right and left tie rods 11R and 11L, and a relay rod 12 that connects the tie rods 11R and 11L to each other, respectively. In this embodiment, the rear wheel turning mechanism B is provided with a power steering mechanism D of the hydraulic type. In the power steering mechanism D, the relay rod 12 is mounted with a cylinder device 13 in which the cylinder 13a is fixed to the vehicle body. And the relay rod 12 is provided integrally with a piston 13d dividing the cylinder 13a into a pair of compartments 13b and 13c that in turn are connected through pipes 14 and 15, respectively, to a control valve 16. To the control valve 16 are connected pipes 18 and 19 extending each from a reservoir tank 17. To the pipe 18 that forms an oil feed line is connected an oil pump 20 that is driven by the engine of the vehicle (not shown). The control valve 16 is of a so-called booster valve type (spool type) in which the control rod 21 is of the sliding type. An input member 21a of the control rod 21 is also used as a moving member of a turning ratio changing mechanism E, as will be described below, and an output member 21b of the control rod 21 is integrated to the relay rod 12 of the rear wheel turning mechanism B.

In the power steering mechanism D, when the control rod 21 is moved left in FIG. 2, the relay rod 12 is also moved left in FIG. 2, as is known to the skilled in the art. This causes the right and left knuckle arms 10R and 10L to rotate clockwisely in FIG. 2 about their respective pivotal centers 10R' and 10L', thereby turning right the respective rear wheels 2R and 2L. As the rear wheels are turned, oil pressure is fed to the compartment 13c of the cylinder device 13 according to a sliding amount of the control rod 21 to multiply the force acting to drive the rod rod 12. Likewise, when the control rod 21 is moved right in FIG. 2, the rear wheels 2R and 2L are turned left in accordance with the sliding amount of the control rod 21 with the force being multiplied force by oil pressure fed to the compartment 13b of the cylinder device 13.

The front wheel turning mechanism A, like the rear wheel turning mechanism B, is provided with a power steering mechanism F that includes a cylinder device 65 mounted on the relay rod 5 of the front wheel turning mechanism A, a cylinder 65a of the cylinder device 65 being fixed to the vehicle body. A piston 65d is integrated to the relay rod 5 so as to divide the cylinder 65a into a pair of compartments 65b and 65c. The compartments 65b and 65c in the cylinder 65a are connected through the respective pipes 66 and 67 to a control valve 68 of the rotative type mounted on the shaft 8 of the steering mechanism C. To the control valve 68 are connected a pipe 70 extending from a flow dividing valve 69 connected to the output side of the oil pump 20 and a pipe 71 branched off from the pipe 19.

The power steering mechanism F is to transmit the force of the steering wheel 9 to the relay rod 5 by multiplying the oil pressure fed to the compartments 65b and 65c of the cylinder device 65. As the action of the power steering mechanism F itself is basically the same as the power steering mechanism D described above, no more description thereon is omitted here.

The steering mechanism C is associated with the rear wheel turning mechanism B by way of the front wheel turning mechanism A and the turning ratio changing device E. An input rod 22 is extending forward from the turning ratio changing mechanism E, and a pinion 23 mounted on the front end of the input rod 22 is in mesh with a rack 24 formed on the relay rod 5 of the front wheel turning mechanism A. As an output rod of the turning ratio changing device E serves the input member 21a of the control rod 21 in the control valve 16.

An example of the turning ratio changing device E will be described with reference to FIG. 3. In the turning ratio changing device E, the input member 21a of the control rod 21 is supported so as to move slidably in the transverse direction of the vehicle body along a line $l_1$, in FIG. 3. The turning ratio changing device E includes a swinging arm 31 that is supported at its base portion for pivotal movement by a pin 33 with respect to a holder 32. The holder 32 is supported on the vehicle body so as to be rotatable about a line $l_2$ perpendicular to the line $l_1$ along which the input member 21a is movable. The pin 33 is positioned at the intersection of the lines $l_1$ and $l_2$ and extends in the direction perpendicular to the line $l_2$. Accordingly, although the swinging arm 31 is able to swing about the pin 33, the rotation of the holder 32 varies an angle of inclination of the pin 33 with respect to the line $l_1$, i.e., an angle of inclination of an orbit plane of the swinging movement about the pin 33 with respect to a plane (reference plane) perpendicular to the line $l_1$.

The front end portion of the swinging arm 31 is connected with the input member 21a by way of a connecting rod 34. Specifically, the connecing rod 34 is connected through a ball joint 35 to the front end portion of the swinging arm 31, on the one hand, and through a ball joint 36 to the input member 21a, on the other hand.

The distance between the ball joints 35 and 36 positioned at each of the end portions of the swinging arm 31 is kept constant by the connecting rod 34. Therefore, when the ball joint 35 is moved in the left-and-right direction in FIG. 3, the input member 21a is also moved in the left-and-right direction in FIG. 3 in accordance with the movement of the ball joint 35 (36).

Swinging movement of the swinging arm 31 about the pin 33 is made according to the movement of operation of the steering mechanism C, i.e., to the turning angle of the steering wheel. For this purpose, in this embodiment, the connecting rod 34 is connected with a rotary plate 37 composed of a bevel gear. The rotary plate 37 is supported rotatively on the vehicle body so as to allow the rotary axis 37a thereof to coincide with the line $l_1$. The connecting rod 34 penetrates slidably the eccentric portion of the rotary plate 37 by way of a ball joint 38, and the rotary plate 37 composed of the bevel gear is in mesh with a bevel gear 39 that in turn is connected to the input rod 22.

The swinging arm 31 is swung by the rotary plate 37 about the pin 33 by an amount corresponding to the turning angle of the steering wheel 9. When the axis of the pin 33 inclines against the line $l_1$, the ball joint 35 moves in the right-and-left direction in FIG. 3, i.e., toward the line $l_1$, in response to the pivotal movement about the pin 33 and this movement is transmitted through the connecting rod 34 to the input member 21a, thereby leading to the movement of the input member 21a. And the movement of the ball joint 35 in the right-and-left direction in FIG. 3 is changed to change a turning ratio when an angle of inclination of the pin 33, that is, an angle of rotation of the holder 32, is changed, even if an angle of a swinging movement of the swinging arm 31 about the pin 33 is identical.

In order to change the angle of inclination, a sector gear 40 is fixedly mounted as a worm wheel on the rotary shaft 32a of the holder 32 and is in mesh with a worm gear 41 that is rotatively driven by a step motor as inclination angle changing means by way of a pair of bevel gears 42 and 43.

The following is description on impacts of the swinging angle of the swinging arm 31 about the pin 33 and the angle of inclination of the swinging arm 31 (the angle of inclination of the pin 33) on the movement of the ball joint 35 in the direction of the line $l_1$. In the following description, the swinging angle of the swinging arm 31 about the pin 33 is represented by $\theta$, the reference plane perpendicular to the line $l_1$ is represented by $\delta$, the angle of inclination of the swinging plane of the swinging arm 34 with respect to the reference plane $\delta$ is represented by $\alpha$, and the eccentric distance of the ball joint 35 from the pin 33 is represented by r. In this case, the amount of movement X of the ball joint 35 in the direction of the line $l_1$ is represented by the formula: $X = r \tan \alpha \cdot \sin \theta$ and is a function of $\alpha$ and $\theta$. Accordingly, when the angle $\alpha$ of inclination is fixed at a particular value, on the one hand, the amount of movement X depends solely upon the function of $\theta$ or the turning angle of the steering wheel. When the angle $\alpha$ of inclination is changed, on the other hand, the amount of movement X is changed even if the turning angle of the steering wheel is identical. In other words, the change of the angle $\alpha$ of inclination leads to the change of turning ratios. That is, an angle of revolution of the step motor 44 (step numbers) corresponds primarily will the turning ratio.

The mechanism of changing turning ratios itself is disclosed in Japanese Patent Early Publication No. 193,770/1985 and the corresponding U.S. Pat. No. 4,572,316. A description thereon will accordingly be omitted here.

Figure 4:
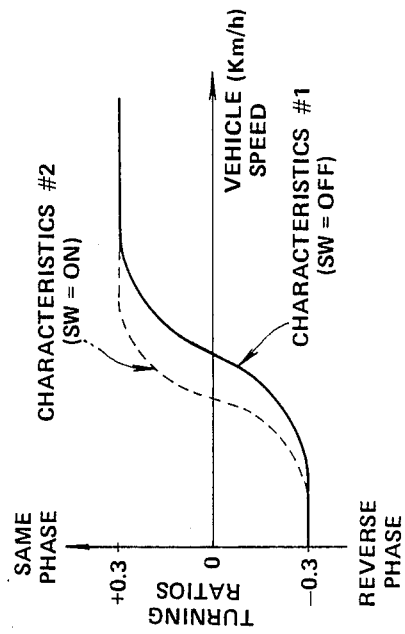
FIG. 4 is a graph illustrating a characteristic curve of turning ratio characteristics.

The turning ratios may be changed on the basis of turning ratio characteristics predetermined using a vehicle speed as a parameter, for instance, as shown in FIG. 4. The turning ratio characteristics includes a first turning ratio characteristics (hereinafter referred to as characteristics #1) and a second turning ratio characteristics (hereinafter reffered to as characteristics #2) that offsets the characteristics #1 at the low speed part. The characteristics #1 and the characteristics #2 can be conveniently switched or selected from each other by a manual operation. It is needless to say that the turning ratio characteristics as demonstrated in FIG. 4 is memorized by a ROM.

Turning now back to FIG. 2, the rear wheel power steering mechanism D includes a pair of return springs 13e and 13f in order to force the rear wheels 2R and 2L at the neutral position, that is, in the state to make a straight drive. The return springs 13e and 13f are designed so as to urge the relay rod 12 for the rear wheels with equivalent forces toward the neutral position from the right and left directions. The compartments 13b and 13c of the rear wheel power steering mechanism D are connected to each other through a through passage 46 that in turn is connected with an electromagentic on-off valve 47. When the on-off valve 47 is closed, the rear wheels 2R and 2L are turned opposite to the spring 13e or 13f with the hydraulic pressure fed to the compartment 13b or 13c, respectively. When the on-off valve 47 is open so as to keep the pressures in the compartments 13b and 13c identical to each other, the rear wheels 2R and 2L are forced at the neutral position by the action of the springs 13e and 13f. It is a matter of course that an urging force of the springs 13e and 13f should be predetermined to be large enough to be kept at the neutral position opposite to the outside force given by the rear wheel 2R or 2L, while cornering.

Figure 3:
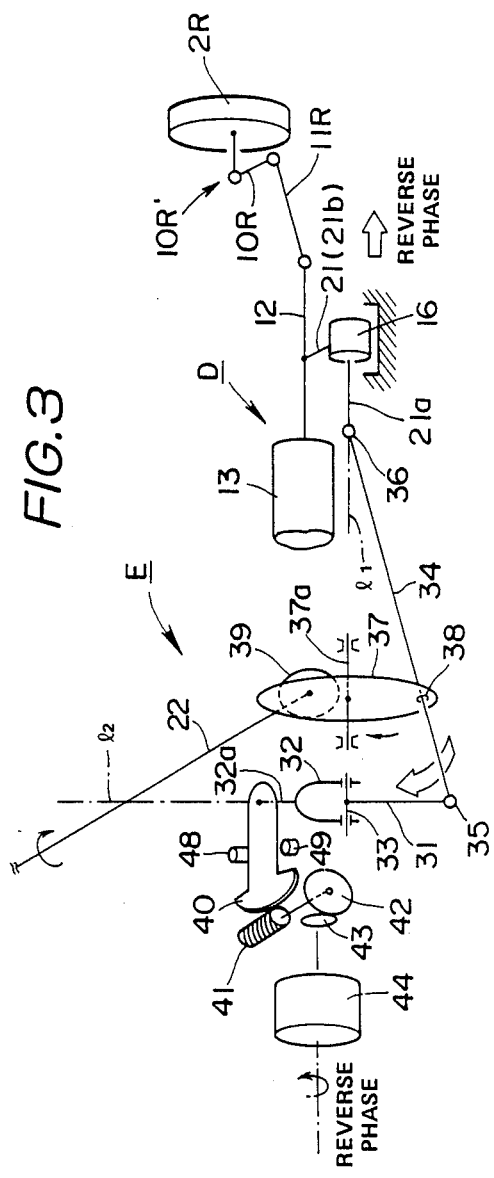
FIG. 3 is a skeletal view illustrating a portion of a turning ratio changing mechanism.

The sector gear 40 driven by the step motor 44 is arranged so as to cause both ends of swinging strokes to be controlled by a stopper 48 at the same phase part and a stopper 49 at the reverse phase part, respectively, as shown in FIG. 3. A range of rotation of the step motor 44 required over the whole range of swinging movement of the sector gear 40, i.e., from the stroke end and at the same phase part to the stroke end at the reverse phase part, is 580 in the step number.

In FIG. 2, reference numeral 51 denote a control unit constituted, for example, by a microcomputer, which is equipped basically with a CPU, a ROM, a RAM and a CLOCK. The control unit 51 is designed so as to allow signals to be input from a vehicle speed sensor 53 and signals from a road surface friction coefficient μ sensor 55 for detecting a sliding state of a road surface, i.e., a road surface friction coefficient μ. The control unit 51 outputs signals to the step motor 44 and the on-off valve 47.

Figure 16:
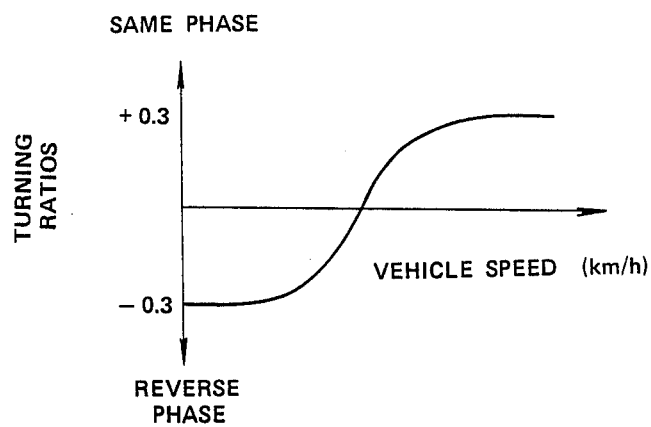
Figure 17:
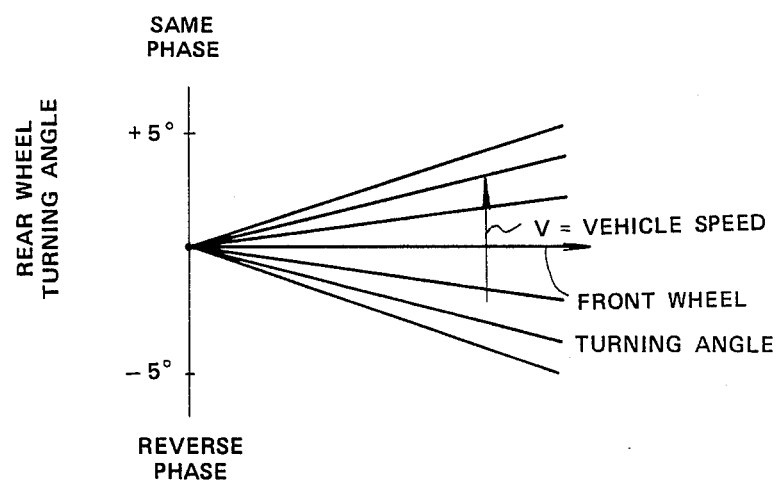

The control unit 51 memorizes a turning ration characteristics, for example, as indicated in FIG. 16. The turning ratio characteristics is set using a vehicle speed as a parameter and a turning ratio is designed so as to be shifted to the same phase direction side as the vehicle speeds get larger. FIG. 17 shows the relationship of a rear wheel turning with a front wheel turning angle as a replacement of the turning ratio characteristics indicated in FIG. 16.

The control by the control unit 51 will be described with reference to a block diagram indicated in FIG. 18. It is to be noted here that turning rations are designed so as to allow its changing speed to be always smaller when a road surface friction coefficient μ is smaller, i.e., when the road surface is more slippery, than when a road surface friction coefficient μ is larger, i.e., when the road surface is less slippery. It is also to be noted here that the road surface friction coefficient μ sensor 52 detects road surface friction coefficients μ in a continuously variable manner and allows a turning ratios changing velocity to be changed in a continuously variable manner in accordance with the road surface friction coefficients μ.

Referring to FIG. 18, reference numeral 81 denotes a turning-ratio arithmetic circuit that computes a corresponding target turning ratio (R) in accordance with a vehicle speed signal (V) from the vehicle speed sensor 53. It may be possible to determine a target turning ratio (R) corresponding to the vehicle speed (V) from turning ratios data, as shown in FIGS. 16 and 17, memorized in advance in a memory. The target turning ratio (R) thus obtained is input to a circuit 82 for forming a motor driving signal and converted into a target step number CP of the step motor 44 necessary to become the target turning ratio (R). From the circuit 82 for forming the motor driving signal is output a pulse signal corresponding to the target step number CP. The pulse signal is then input to the step motor 44 through a delay circuit 83 and a driver circuit 84 as will be described below. Thus, the step motor 44 is driven up to the target step number CP at a speed in accordance with a speed at with the pulse signals are input, thereby changing the rear wheel turning ratio to the target turning ratio (R).

Figure 23:
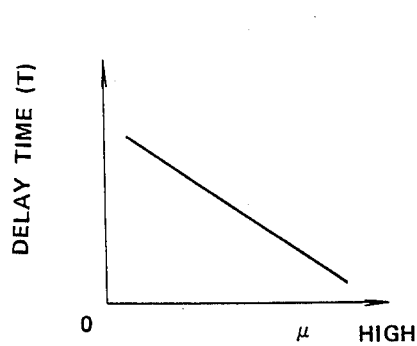

The delay circuit 83 is designed so as to delay a pulse signal to be output to the driver circuit 84 by a predetermined time (T). The delay time (T) is designed to be set at a value in accordance with a road surface friction coefficient μ in a delay time setting circuit 85. More specifically, in the delay time setting circuit 85, the delay time T is set so as to become larger as the road surface friction coefficient μ gets smaller, as shown in FIG. 23, on the basis of the μ signal from the road surface friction coefficient μ sensor 52, and the delay treatment is carried out in the delay circuit 83 on the basis of the delay time T set by the delay time setting circuit 85.

Figure 24:
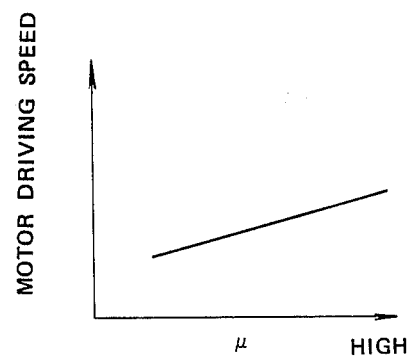

Thus, as shown in FIG. 24, the more slippery the road surface, i.e., the lower the road surface friction coefficient μ is, the smaller the driving speed of the step motor 44 is. As a result, the rear wheels are caused to be turned slowly as the road surface gets more slippery or as the road surface fiction coefficient μ gets lower, the controlling a rapid change in the behavior of a vehicle body.

FIG. 19 shows another embodiment of the control in accordance with the present invention, which is designed to set two stages of speeds of changing the turning ratios by breaking down the road surface friction coefficients μ into two from a predetermined reference valve $\mu_0$. FIG. 19 has the characteristics in the circuits 83 and 85 as compared to FIG. 18, with substantially the same functions in other respect as those in FIG. 18.

In FIG. 19, the delay circuit 83 contains a position sensor 45 (also referring to FIG. 2) for detecting an actual position of the step motor 44 (or an actual turning ratio), a D/A converter 86, a timer circuit 87, a relay switch 88 incorporated in the timer circuit 87, and a differential amplifier 89. The timer circuit 87 is composed of two resistors $R_1$ and $R_2$ and a capacitor C. When the relay switch 88 is turned on, the delay time T (in seconds) is set to become:

$$T = R_1 \times R_2 \times C(R_1 + R_2).$$

When the relay switch 88 is turned off, the delay time T (in seconds) is set to become:

$$T = R_2 \times C.$$

The D/A converter 86 is to convert digital signals from the circuit 82 into analog signals. The differential amplifier 89 is to output to the driver circuit 84 a signal so as to reduce the difference between the target turning ratio signal delayed by the timer circuit 87 and the signal from the position sensor 45.

The delay time setting circuit 85 contains a comparater 90, a battery 91 for a reference voltage emission, and a relay coil 92. The comparater 90 is designed to output a high signal when the μ signal from the μ sensor 52 is larger than the reference value $\mu_0$ in comparison of the μ signal from the μ sensor 52 with a reference voltage from the battery 91 (corresponding to the reference value $\mu_0$ of the road surface friction coefficient μ). The relay coil 92 is to turn the relay switch 92 on or off and is designed to be energized by the high signal from the comparater 90 to turn the relay switch 88 on.

With this arrangement, the relay switch 88 is turned on when the road surface friction coefficient μ is larger than the reference value $\mu_0$, on the one hand, whereby the delay time T is set to become smaller, i.e., the speed of changing the turning ratios is rendered larger. When the road surface friction coefficient μ is smaller than the reference value $\mu_0$, on the other hand, the relay switch 88 is turned off and the delay time T is set to become larger, i.e., the speed of changing the turning ratios is rendered smaller. These relationships are indicated diagrammatically in FIGS. 21 and 22.

Figure 20:
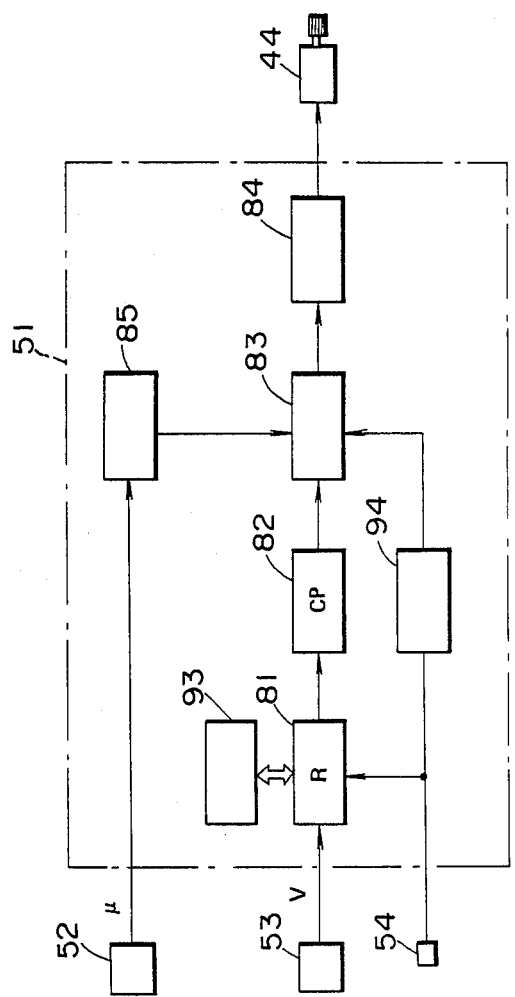

FIG. 20 illustrates an example of the control where are plural turning ratio characteristics. The arrangements identical to those in FIG. 18 are referred to here as reference numerals identical thereto. FIG. 20 contains, in addition to those contained in FIG. 18, a characteristics selecting switch 54 (also referring to FIG. 2), a characteristics memorizing circuit 93, and a timer circuit 94. The characteristics memorizing circuit 93 is adapted to memorize, for example, two kinds of turning ratio characteristics as shown in FIG. 4. The characteristics selecting switch 54 is designed to be turned on or off in accordance with a manual operation of an operator, and ON or OFF signals from the characteristics selecting switch 54 are input into a turning ratio arithmetic circuit 81 where a target turning ratio (R) is computed. The target turning ratio (R) is computed therein on the basis of the turning ratio characteristics selected in accordance with the ON or OFF signals from the switch 54. More specifically, when the switch 54 is turned off, characteristics #1 as shown in FIG. 4 is selected. When the switch 54 is turned on, characteristics #2 as shown therein is selected.

Figure 21:
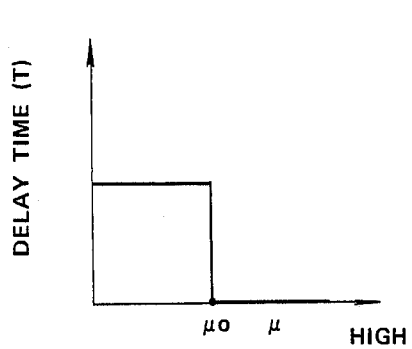
FIGS. 21 and 23 are each a graph showing the relationship of a road surface friction coefficient $\mu$ with a delay time.
Figure 22:
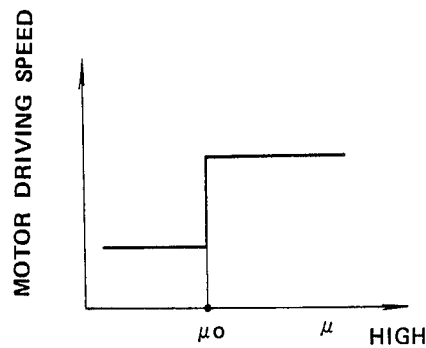
FIGS. 22 and 24 are each a graph showing the relationship of a road surface friction coefficient $\mu$ with a motor driving velocity.

The ON or OFF signals from the characteristics selecting switch 54 are input into the timer circuit 94 that is designed so as to input a delay signal to the delay circuit 83 by a predetermined time from when the switch 54 is switched from ON to OFF or OFF to ON. It is thus to be noted here that the delay circuit 83 causes the delay even when the turning ratio characteristics is changed, in addition to the delay in acordance with the road surface friction coefficient $\mu$ as have been descrived with respect to FIG. 18. In the arrangement as shown in FIG. 20, the delay in accordance with the road surface friction coefficient $\mu$ may be effected in substantially the same manner as in FIG. 18 (FIGS. 23 and 24) or FIG. 19 (FIGS. 21 and 22).

Control by the control unit 51 will be described more in detail with reference to flow charts as shown in FIGS. 5 to 10. As means for changing a velocity of rotation of the motor 44 is used means for changing a step driving frequency, i.e., means for changing a rate of steps to be driven per second. In this embodiment, attention is drawn to the possibility that the step number deviates from the actual step position in the step motor 44, and the registration of the reference position, i.e., the initialization of the motor position, is carried out. The initialization of the motor position is made, in this embodiment, by causing the sector gear 40 to come in touch with the stopper 49 at the reverse phase part. The position where the sector gear 40 is caused to be in touch with the stopper 49 is made the origin where the step number is "0", and a step number driven from the origin is represented by a motor position "MP" at the position where the motor is actually located. The initialization of the motor position is conducted at the time of the control start or immediately after the engine start and whenever the vehicle speed is made zero. Flow charts indicated in this embodiment include two kinds, one being "Flag 1" and the other being "Flag 2". Each flag has the following meaning:

Flag 1:
This flag is to distinguish whether or not the initialization of the motor position is being conducted. When the initialization is finished is represented by "0", and when the initialization is being done is represented by "1".

Flag 2:
This flag is used to carry out the initialization of the motor position only once whenever the vehicle speed is made zero from the running state. When the initialization of the motor position was done once, it is represented by "1".

Figure 5:
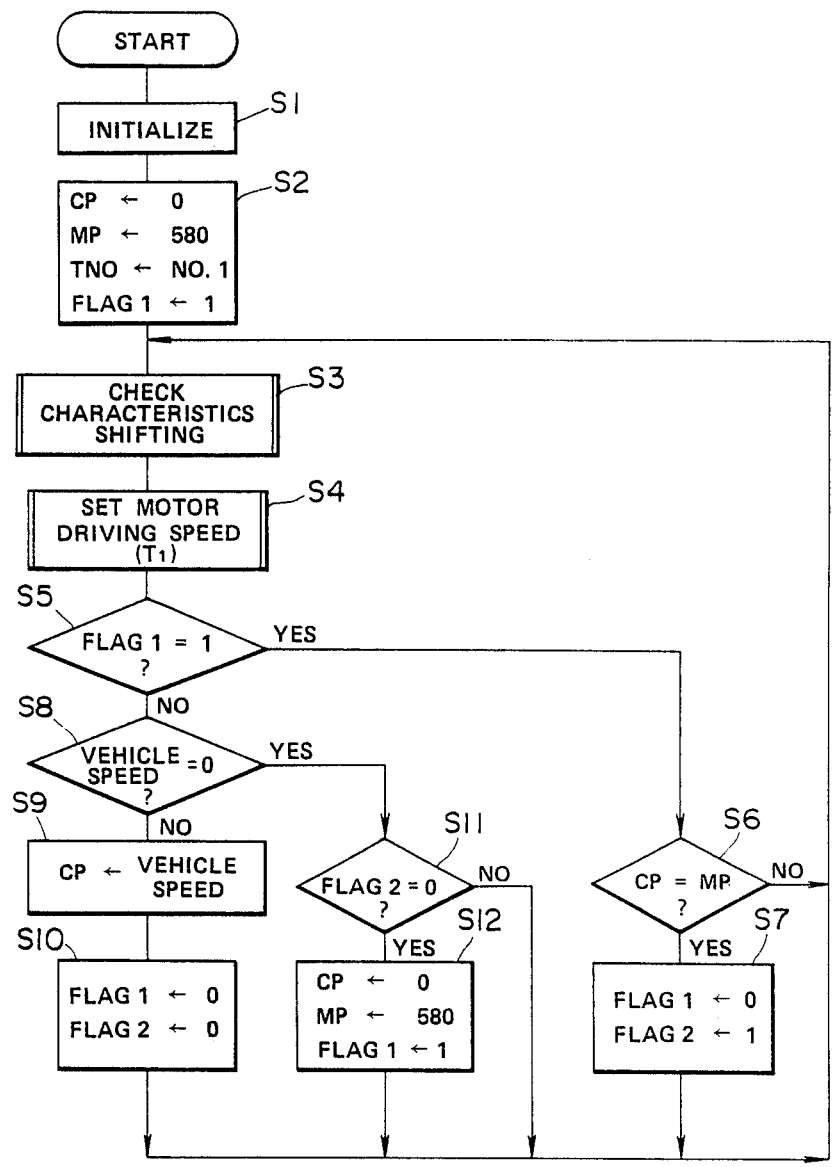
Figure 9:
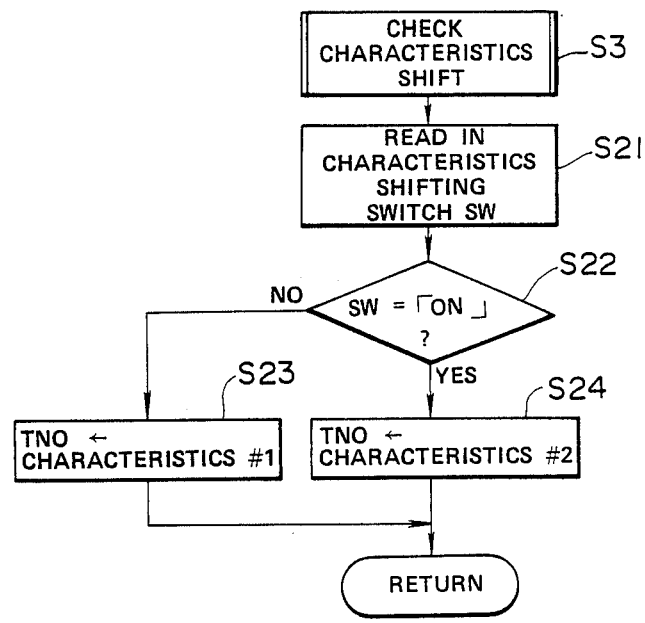

With the above premises, the present invention will be described with reference to each of the drawings in accordance with the flow charts as shown in FIGS. 5 to 9. For brevity of description, interrupt treatments as shown in FIGS. 6 to 8 for the main routine as shown in FIG. 5 will be described first. In the following description, the reference symbol "S" means step.

INTERRUPT TREATMENT 1 (FIG. 6)

The interrupt routine as shown in FIG. 6 is to drive the step motor 44 so as to match a turning ratio with a vehicle speed on the basis of the characteristics #1 or the characteristics #2. The interrupt into the main routine as shown in FIG. 5 is done at every predetermined time ($T_1$) set by a timer. In the drawing, "CP" denotes a target step number neccesary to determine the turning ratio on the basis of the characteristics #1 or the characteristics #2 shown in FIG. 4, and "MP" denotes, as described above, a step number representing the swinging position of the sector gear 40 (the turning position of the rear wheels 2R and 2L) from the origin corresponding to the position of the stopper 49 at the reverse phase part.

Under the above conditions, whether or not a target step number CP corresponds to an existing position MP is discriminated in S41. If YES in S41, the rear wheels 2R and 2L are positioned at a turning angle according to the predetermined turning ratio charcteristics, and the flow proceeds to S42 where electric current to be fed to the step motor 44 is decreased (current-down). After the current-down, a timer is set in S43 at an interrupt time ($T_1$) for the next interrupt.

If the discrimination in S41 is NO, electric current to be fed to the step motor 44 is increased for driving the step motor 44 in S44, i.e., the current-down is cancelled. Then, in S45, whether or not the target step number CP is greater than the existing position MP is discriminated. The discrimination in S45 is made NO when the existing position MP of the step motor 44 is learned to the same phase side from the target step number CP. In this case, in S46, the step motor 44 is driven by one step toward the reverse phase side. Following this operation, the existing position MP is renewed by one step in S47 and the flow proceeds to S43. When it is discriminated YES in S45, the step motor 44 is driven by one step to the same phase side in S48, and the existing position MP is renewed by one step in S49 and the flow proceeds to S43.

When the step motor 44 is intended to be driven, for instance, at a driving frequency at the rate of 100 steps per second, the timer is set at 10 msec as the interrupt time ($T_1$). That is, the speed of rotation of the motor 44 is represented by $1/T_1$. The driving frequency of the motor 44 or the rotation speed thereof is designed to be changed by changing the interrupt time ($T_1$) by way of a motor driving speed setting treatment (S4 in FIGS. 5 and 10) as will be described below.

INTERRUPT TREATMENT 2 (FIG. 7)

This interrupt treatment is made as a pretreatment for the detection of vehicle speeds. A vehicle speed sensor 53 to be used here generates pulses in response to the rotation of the metering cable of a speedometer, and the interrupt into the main routine in FIG. 5 is made whenever the pulse is generated, i.e., at the rising of a pulse or at the falling thereof. As the vehicle speed sensor 53 may be used here, for example, a 20 pulse sensor designed to set the pulse number to be 20 when the metering cable is rotated by one, and the metering cable is designed to rotate by 637 revolutions at every kilometer of running. This means that the number of pulses generating for one kilometer of running becomes 12,740 pulses. Thus the pulses generated from the vehicle speed sensor 53 are counted and memorized as $P_{CN}$ in S51.

INTERRUPT TREATMENT 3 (FIG. 8)

This interrupt treatment is to design the pulse number described under the above interrupt treatment 2 (FIG. 7) to be utilized as a vehicle speed in km/h. IN this case, the interrupt into the main routine in FIG. 6 is arranged to be made at a rate of every 282,575 msec from the relationship of the vehicle speed sensor 53 set as described above and the metering cable. That is, in S52, the above value $P_{CN}$ is set as it is as a vehicle speed value (km/h) and then, in S53, the value $P_{CN}$ counted in S51 in FIG. 7 is cleared.

It is to be understood here that FIGS. 7 and 8 illustrate merely examples of vehicle speed detection and that the vehicle speed may be detected conveniently by means of conventional methods.

MAIN ROUTINE (FIG. 5)

In S1, the whole system is initialized, and, in S2, CP is set "0", MP is set "580", flag 1 is set "1" and a turning ratio characteristics (TNO) is set as charcteristics #1. That CP is set as 0 is to return the sector gear 40 up to coming in touch with the stopper 49 at the reverse phase part by forcibly carrying out the treatment from S45 to S46, as will be apparent from the description on FIG. 6, that is, to conduct the initialization of the motor position. That MP is set as 580 is to enable the sector gear 40 to be always returned to the origin, wherever it is positioned, after getting in touch with the stopper 49 at the reverse phase part when the sector gear 40 is returned by 580 steps. That the turning ratio characteristics is set as the characteristics #1 is because the characteristics #1 is a basic characteristics for four-wheel steering.

Then whether the turning ratio characteristics shift is checked in S3 and a motor driving speed is set in S4, as will be described below. After the flow proceeds to S5, it is discriminated whether or not flag 1 is "1". In S5, the flag 1 is originally set as "1" so that, when it is discriminated as YES, the flow proceeds to S6 where it is discriminated whether or not CP=MP. If NO in S6, the flow is returned to a loop starting from S3 to S6. During the loop, the step motor 44 is driven, as a FIG. 6, so as to cause MP to approach to "0" and eventually to reach MP=CP. At the time of CP=MP, the initialization of the motor position is completed and the flag 1 is set as "0" and flag 2 is set as "1" in S7.

If NO in S5, it is discriminated whether or not the current vehicle speed is zero in S8. If NO in S8, a target step number CP is set in S9. It is needless to say that this CP value is a value corresponding to a turning ratio determined by referring the current vehicle speed to the characteristics #1 or #1. Thereafter, in S10, both the flag 1 and the flag 2 are set each to the "0" and the flow returns to S3.

If YES in S8, the flow advances to S11 where it is discriminated whether the flag 2 is "0". If NO in S11, the flow returns to S3 as it is not necessary to conduct the initiarization of the motor position again because the step motor 44 is not driven after the initialization of the motor position. If YES in S11, the flow proceeds to S12 to carry out the initialization of the motor position. In S12, CP=0, MP=580 and FLag 1 is set "1" (corresponding to S2), then the initialization of the motor position is conducted through S5 and S6.

CHECKING OF CHARACTERISTICS SHIFT (FIG. 9)

In S21, the ON/OFF state of the characteristics shifting switch (SW) is read in. Then it is discriminated whether the characteristics shifting switch 54 is "ON" in S22. If NO in S22 or the characteristics #1 is selected, the flow advances to S23 where the turning ratio characteristics is set to be the characteristics #1. The target step number CP to be set in S9 is also designed to be based on the characteristics #1 in accordance therewith.

If YES in S22 or the characteristics #2 is selected, the flow proceeds to S24 where the turning ratio characteristics is set as the characteristics #2. In accordance therewith, the target step number CP to be set in S9 is designed to be based on the characteristics #2.

SETTING OF A STEP MOTOR DRIVING SPEED (FIG. 10)

Figure 10:
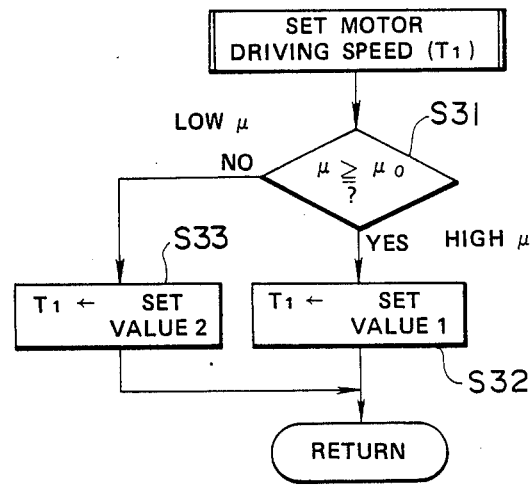

As shown in FIG. 10, road surface friction coefficients $\mu$ are broken down into two stages on the basis of a predetermined reference value $\mu_0$, and the interrupt time ($T_1$) in S4 is changed into shorter or longer values in accordance with the road surface friction coefficients $\mu$. More specifically, when an actual road surface friction coefficient $\mu$ is larger than the reference value $\mu_0$ or when the road surface is less slippery, on the one hand, the interrupt time ($T_1$) is set to be a smaller value so that the motor driving speed of the step motor 44 is caused to be faster. When an actual surface friction coefficient $\mu$ is smaller than the reference value $\mu_0$ or when the road surface is slippery, on the other hand, the interrupt time ($T_1$) is set to be a larger value so that the motor driving speed of the step motor 44 is caused to be slowed down. In other words, the relationship arises as shown in FIG. 22.

In S31, it is discriminated whether or not the actual road surface friction coefficient $\mu$ is larger than the reference value $\mu_0$. If YES is S31, it is found that the road surface friction coefficient $\mu$ is large and the road surface is less slippery so that the interrupt time ($T_1$) is set in S32 to become a set value 1 that is set to be a relatively short time. If NO in S31, it is found that the road surface friction coefficient $\mu$ is small and the road surface is so slippery that the interrupt time ($T_1$) is set in S33 to become a set value 2 that is set to be a relatively long time.

VARIATION EXAMPLE (FIG. 11)

Figure 11:
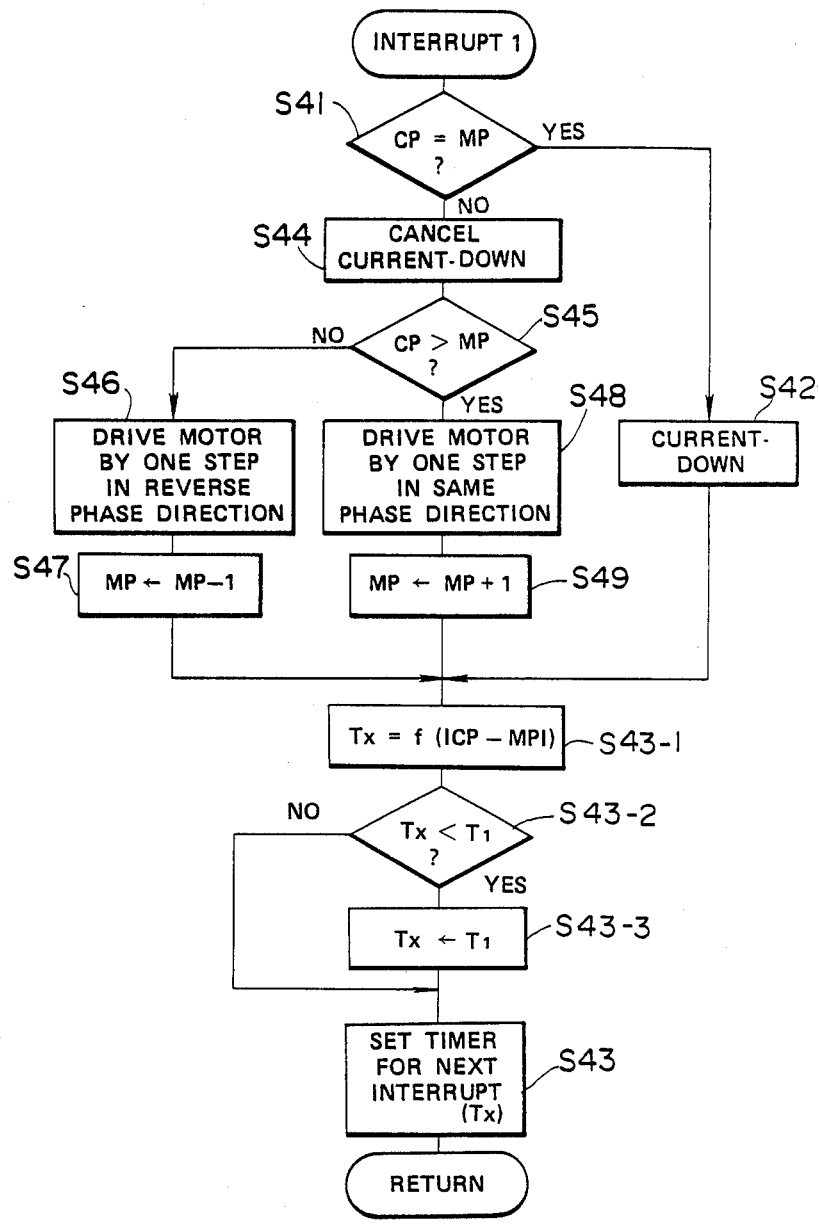

FIG. 11 shows a variation example in which a speed of changing the turning ratio gets faster as the deviation (|CP-MP|) between the actual turning ratio and a target turnng ratio gets larger. The maximum driving speed of the step motor 44 is designed so as to be changed in accordance with the road surface friction coefficient $\mu$ by setting the maximum value on the turning ratio changing speed in accordance with the deviation. More specifically, the maximum value when the road surface friction coefficient $\mu$ is smaller is set to be smaller than the maximum value when the road surface friction coefficient $\mu$ is larger.

On the premise that the flow charts are used in FIGS. 5 through 10, FIG. 11 is a flow chart in which what is meant by the reference symbol $T_1$ in FIGS. 5, 6 and 10 is altered and a time $T_x$ in accordance with the deviation is used. The time $T_x$ is meant as a time valiable in accordance with the deviation and a replacement of the interrupt time $T_1$ used in FIGS. 5, 6 and 10. This means that the larger the deviation is, the smaller the time $T_x$ is, thus rendering the driving speed of the step motor 44 faster. The time $T_1$ used in FIG. 11 means the maximum valve of the time $T_x$ in accordance with the road surface friction coefficient $\mu$. This means that, when the road surface friction coefficient $\mu$ is smaller, on the one hand, the maximum value $T_1$ of the time $T_x$ is set as VALUE 2 in S32, thus controlling the maximum driving speed of the step motor 44 so as to get slowed down. When the road surface friction coefficient $\mu$ is larger, on the other, the maximum value $T_1$ of the time $T_x$ is set as VALUE 1 in S33, thus contolling the maximum driving speed of the step motor 44 so as to get faster.

With the above set forth as a premise, FIG. 11 will be described in which the description on up to S42, S47 and S49 are the same as in FIG. 6. In FIG. 11, the time $T_x$ is set in accordance with the deviation between the actual turning ratio and the target turning ratio in S43-1 after each of S42, S47 and S49. In this case, the larger the deviation is, the smaller the time $T_x$ is. In S43-2, it is distinguished whether or not the time $T_x$ is smaller than the maximum value $T_1$ that was in turn set in S32 or in S33. If YES in S43-2, the motor driving speed of the step motor 44 becomes greater than the maximum value so that, in this case, the time $T_x$ is set, in S43-3, to become the maximum value $T_1$. Thereafter, in S43, a timer is set to allow the next interrupt to be made after the time $T_x$. If it was distinguished in S43-2 to be NO, the motor driving speed of the step motor 44 becomes smaller than the maximum value so that the flow proceeds to S43.

FIGS. 25 through 32 illustrate each an embodiment for detecting a road surface friction coefficient $\mu$.

Figure 25:
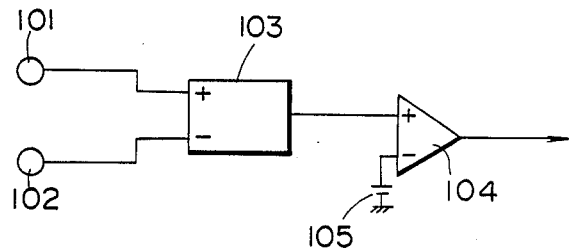

Referring now to FIG. 25, reference numeral 101 denoted a first sensor for detecting the number of rotations of driving wheels (rear wheels 2R, 2L) and reference numeral 102 denotes a second sensor for detecting the number of rotations of following wheels (front wheels 1R, 1L). The magnifications of the numbers of rotations from the two sensors 101 and 102 are input a subtracter 103 that is designed to output a signal in the form of a voltage in accordance with a difference between the numbers of rotations of the driving wheels and the following wheels. The output signal is then input into a comparater 104. The comparater 104 is designed so as to output a high signal when the output signal from the subtracter 103 is greater than a reference voltage from a battery 105 corresponding to the difference in the reference rotation number. It is to be noted here that a high signal from the comparater 104 is output when the difference between the rotation numbers becomes greater than a predetermined value—say, when the road surface friction coefficient $\mu$ becomes so small that the road surface gets more slidable or slippery.

Figure 26:
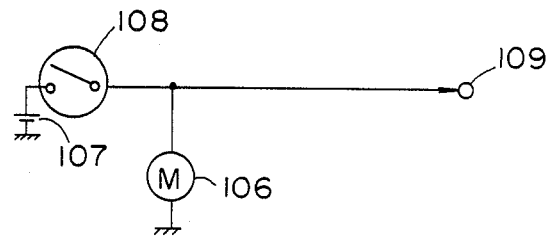

FIG. 26 shows a system containing a wiper driving motor 106, a battery 107, and a switch 108. As shown in FIG. 26, when the switch 108 is turned on to drive the wiper driving motor 106, a terminal 109 is energized. It is designed such that, when the terminal 109 is energized, the road surface friction coefficient $\mu$ is rendered small. The wiper is operated usually when it rains or snow fall, leading to low road surface friction coefficients $\mu$ and a slippery road surface.

Figure 27:
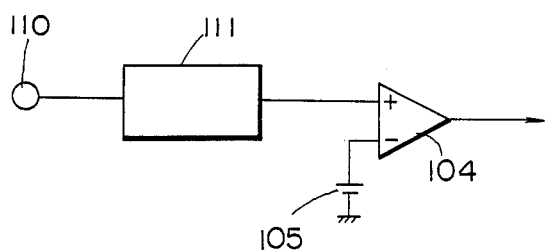

FIG. 27 illustrates a system that contains a sensor 110 for detecting the up-and-down movement of a vehicle body. A judging device 111 judges a vibrations level of the vehicle body on the basis of signals from the sensor 110. When the vibrations level from the sensor 110 is greater than a predetermined value, the comparater 104 is designed to output a high signal. In this case, it is judged that a road surface friction coefficient $\mu$ is low as in instances where a road surface is considerably uneven as on gravel roads. In FIG. 27, reference numerals 104 and 105 correspond to those in FIG. 25.

Figure 28:
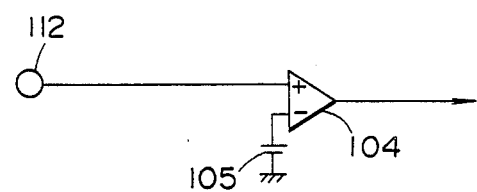

Turning now to FIG. 28, reference numeral 112 is a sensor for detecting outside temperatures. In FIG. 28, reference numerals 104 and 105 correspond to those in FIG. 25. When an outside temperature is higher than a predetermined value, a high signal is output from the comparater 104. When the high signal was output from the comparater 104, it is judged that the road surface friction coefficient $\mu$ is large to the contrary of FIGS. 25 and 27. When it rains or snow falls, the outside temperatures are rendered low.

Figure 29:
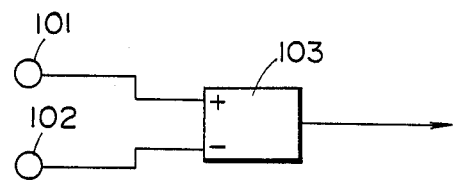

FIG. 29 illustrates an example in which the comparater 104 and the battery 105 are removed from the system as shown in FIG. 25. This system is designed to be preferable when the road surface friction coefficients $\mu$ are to be detected in a continuously variable manner, not in two stages, as when the control is to be made as in FIG. 24.

Figure 30:
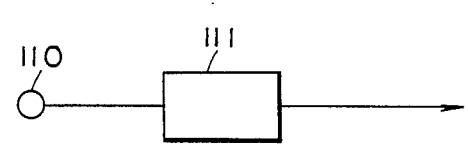

FIG. 30 illustrates an example in which the comparater 104 and the battery 105 are removed from the system as shown in FIG. 27. This system is designed to be preferable as in FIG. 29.

Figure 31:
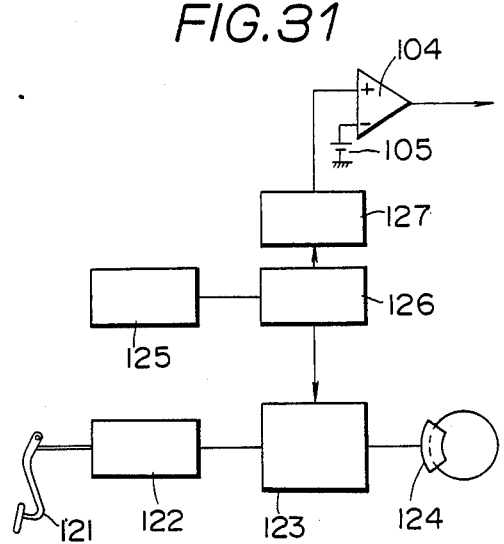

FIG. 31 shows an example adapted to detect the road surface friction coefficient $\mu$ using a skid signal for adjusting brake liquid pressures in a vehicle body equipped with a skid (antibrake lock system) device. In FIG. 31, it is designed such that the brake liquid pressures are caused to generate on a master cylinder 122 in accordance with the forces applied to a brake pedal 121. The brake liquid pressures generated on the master cylinder 122 are transmitted to the wheel cylinder of a brake 124 through a liquid control valve 123 of the electromagnetic type for the antibrake lock system. It is also designed such that signals from a sensor 125 for detecting the rotation number mounted on each of the wheels (1R, 1L, 2R and 2L) are input a skid control circuit 126. In FIG. 31, the sensor 125 is shown as one representative. The control circuit 126 may be composed of a microcomputer, for example, and is to output the skid signals into the control valve 123, as known to the art, thus controlling the wheels not to be locked at the time of an application of the brake. More specifically, as is known to the art, the control circuit 126 contains a judging portion for judging whether or not the wheels are caused to be locked on the basis of an output from each of the sensors 125. When it is judged such that the wheels are caused to be locked, on the one hand, the control valve 123 is operated so as to cause the brake liquid pressures from the master cylinder 122 to be reduced. When it is judged such that the wheels are caused not to be locked, on the other hand, the control valve 123 is operated so as to cause the brake liquid pressures to be increased. Thus, the signals for causing the brake liquid pressures to be reduced or increased become the skid signals. As the skid control like this is known to the art, no more description of this system is omitted here.

The skid signals from the control circuit 126 are also output into a judging device 127 that is designed so as to output signals in accordance with a frequency level of the skid signals, i.e., the number of the signals for reducing or increasing the brake liquid pressures per unit time. When the frequency level is larger than a predetermined value, the comparater 104 is designed to output a high signal indicating that the road surface friction coefficient μ is low. In FIG. 31, the comparater 104 and the battery 105 correspond to those in FIG. 25. It is noted that the system as shown in FIG. 31 is based on the principle that a high frequency level of the skid signals means a low road surface friction coefficient μ.

Figure 32:
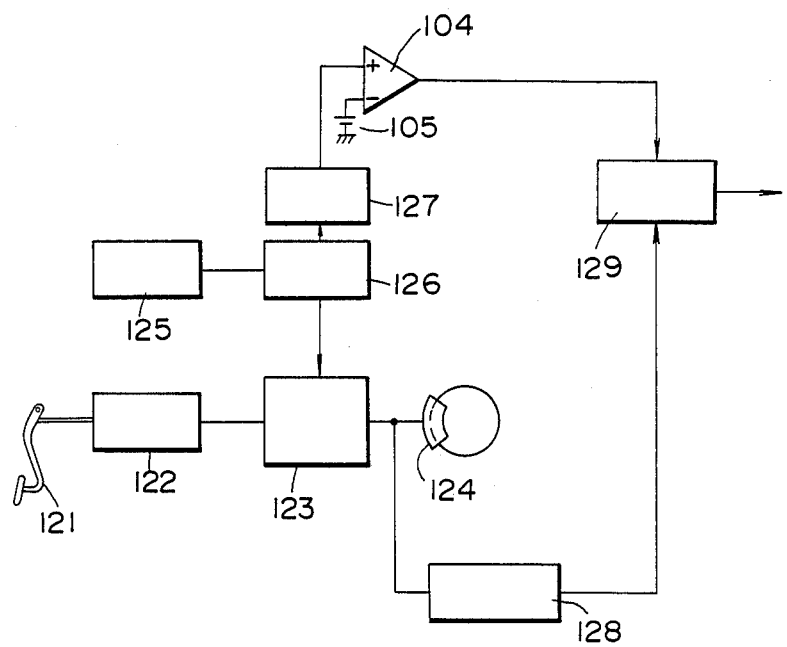

FIG. 32 is an application of FIG. 31, in which it is designed such that the road surface friction coefficients μ are detected in a continuously variable manner. In FIG. 32, reference numeral 128 is a sensor for giving a signal corresponding to the brake liquid pressures to be supplied to the brake 124. The signals from the sensor 128 are output into a gate circuit 129 that is designed to allow the signals from the sensor 128 to pass when a high signal is received from the comparater 104. The system as shown in FIG. 32 is designed such that the smaller that road surface friction coefficient μ is, the smaller the signal to be output from the gate circuit 129—say, actually, the brake liquid pressures to be supplied to the brake 124, on condition that a frequency level of the skid signals is greater than the predetermined value.

As means for detecting a sliding state of a road surface there may be used appropriate means other than those as have been previously described. For example, the sliding state of the road surface may be detected using a turning angle of a steering wheel and the transverse G, as illustrated in FIG. 4 of Japanese Patent Application (Early Publication No. 148,769/1985).

It is to be noted that a combination of two of those detecting means or more can be designed so as to detect a sliding state on a road surface more appropriately and securely. For example, in an instance where the sliding state detecting means as illustrated in FIG. 26 is combined with the sliding state detecting means as illustrated in FIG. 27, the combination permits a detection of both a sliding state with respect to an unevenness on a road surface and a sliding state with respect to a wet degree on a road surface.

As turning ratio characteristics to be used in condition with the present invention may be set various ones, for example, as illustrated in FIGS. 12 to 15.

Figure 12:
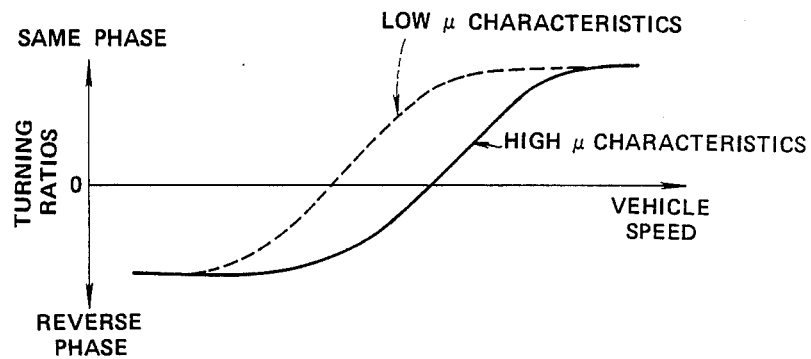
FIGS. 12 to 17 are each a graph illustrating a variation in turning ratio characteristics.

FIG. 12 indicates a first turning ratio characteristics represented by the solid line and a second turning ratio characteristics represented by the broken line. The both turning ratio characteristics use vehicle speeds each as a parameter and are set as characteristics different from each other in accordance with a friction coefficient (μ) of a road surface. The two turning ratio characteristics may be selected manually or automatically in accordance with an output from a sensor for detecting the friction coefficient thereof.

Figure 13:
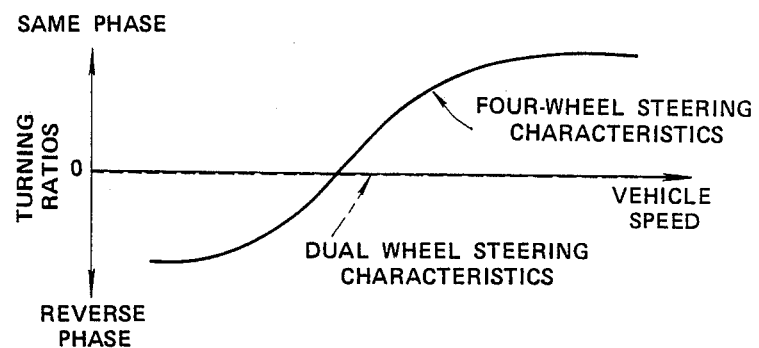

FIG. 13 indicates a first turning ratio characterisics represented by the solid line and a second turning ratio characteristics represented by the broken line. The first turning ratio characteristics is set using a vehicle speed as a parameter, and the second turning ratio characteristics is set as the turning ratio being always zero (turning the front wheels alone without turning the rear wheels). It is preferred in this case to select the turning ratio characteristics manually.

Figure 14:
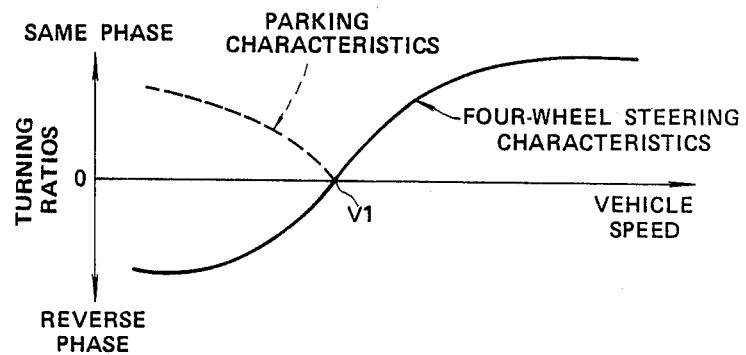

FIG. 14 indicates a first turning ratio characteristics represented by the solid line and a second turning ratio characteristics represented by the broken line, and the both are set using a vehicle speed as a parameter. The first turning ratio characteristics is set so as to cause the turning ratio to be changed farther in the same phase direction as the vehicle speed gets higher, as have been generally adopted when the vehicle speed is used as a parameter. The second turning ratio characteristics is set so as to cause the turning ratio to be shifted farther in the same phase direction as the vehicle speed is far away from a predetermined vehicle speed V1. The second turning ratio characteristics is favorable when a vehicle is parked in a place where there are only narrow spaces before and after the vehicle body (because the vehicle speed is small when being parked). A selection of the turning ratio characteristics in this case is preferably done by a manual operation.

Figure 15:
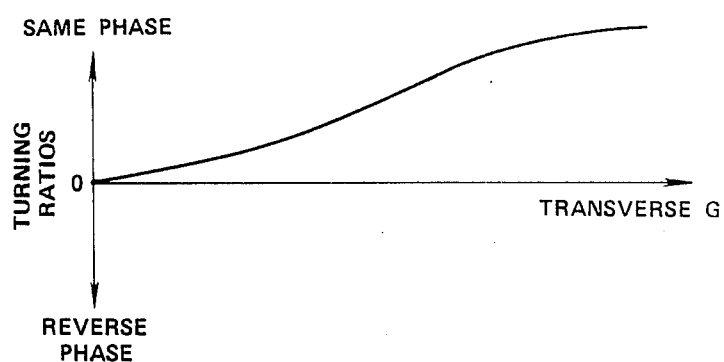

FIG. 15 indicates an example where the turning ratio is set using the transverse G as a parameter.

As an actuator for changing turning ratios may be selected an appropriate one from a step motor, other DC motors and so on. Where the control unit 51 is constituted by a computer, it may be of the digital type or of the analog type.

It is here to be understood that the present invention is not in any way restricted to the embodiments and examples as described above and contains any and various variations described herein as being included within the claims and within the spirit of the present invention.

What is claimed is:

1. In a four-wheel steering apparatus for a vehicle with a front wheels turning mechanism and a rear wheels turning mechanism constructed so as to cause the rear wheels to be turned in association with the front wheels in response to a steering wheel, the four-wheel steering apparatus comprises:

turning ratio changing means for changing a turning ratio of the rear wheel to the front wheel;

sliding state detecting means for detecting a sliding state of a road surface or a road surface friction coefficient μ; and changing speed altering means for altering the changing speed of turning ratios so as to be delayed when the road surface is more slidable or slippery or when the road surface friction coefficient μ is smaller than when the road surface is less slidable or less slippery or when the road surface friction coefficient μ is larger.

2. In a four-wheel steering apparatus for a vehicle with a front wheels turning mechanism and a rear wheels turning mechanism constructed so as to cause the rear wheels to be turned in association with the front wheels in response to a steering wheel, the four-wheel steering apparatus comprises:

turning ratio changing means for changing a turning ratio of the rear wheel to the front wheel;

memory means for memorizing turning ratio characteristics set in accordance with a running state of the vehicle;

running state detecting means for detecting the running state of the vehicle;

target turning ratio determining means for determining a target turning ratio on the basis of the turning ratio characteristics in accordance with the running state of the vehicle;

turning ratio change controlling means for controlling the turning ratio changing means so as to become the target turning ratio;

sliding state detecting means for detecting a sliding state of a road surface or a road surface friction coefficient μ; and changing speed altering means for altering the changing speed of turning ratios so as to be delayed when the road surface is more slidable or slippery or when the road surface friction coefficient $\mu$ is smaller than when the road surface is less slidable or less slippery or when the road surface friction coefficient $\mu$ is larger.

3. The four-wheel apparatus according to claim 2, wherein the turning ratio characteristics is set using a vehicle speed as a parameter.

4. The four-wheel apparatus according to claim 2, wherein said memory means memorizes a plurality of turning ratio charcteristics;
   turning ratio characteristics selecting means for selecting one turning ratio characteristics from said plural turning ratio characteristics is further provided; and
   said target turning ratio determining means is designed so as to determine a target ratio on the basis of the turning ratio characteristics selected by said turning ratio characteristics selecting means.

5. The four-wheel apparatus to claim 4, wherein said plural turning ratio characteristics are set each using a vehicle speed as a parameter; and
   said turning ratio characteristics selecting means is constructed as a manually operative switch.

6. The four-wheel apparatus according to claim 4, wherein said plural turning ratio characteristics different from others in accordance with a sliding state of a road surface.

7. The four-wheel apparatus according to claim 4, wherein said plural turning ratio characteristics includes a first turning ratio characteristics and a second turning ratio characteristics;
   said first turning ratio characteristics is set using a vehicle speed as a parameter; and
   said second turning ratio characteristics is set for the rear wheel turning ratio to become always zero.

8. The four-wheel apparatus according to claim 4, wherein said plural turning ratio characteristics includes a first turning ratio characteristics and a second turning ratio characteristics;
   said first turning ratio characteristics is set for the turning ratio to be changed in the same phase direction as the vehicle speed gets faster;
   and said second turning ratio characteristics is set for the turning ratio to be changed further in the same phase direction as the vehicle speed gets farther from a predetermined vehicle speed.

9. The four-wheel apparatus according to claim 2, wherein the turning ratio uses the transverse G acting on a vehicle body as a parameter and is set for the turning ratio to be changed further in the same phase direction as the transverse G gets larger.

10. The four-wheel apparatus according to claim 2, wherein said turning ratio changing means comprises a turning ratio changing mechanism for changing a turning ratio of the rear wheels in association with a turning angle of a steering wheel, which is interposed between the steering wheel and the rear wheels turning mechanism, and an actuator of the electromagnetic type for operating said turning ratio changing mechanism.

11. The four-wheel apparatus according to claim 10, wherein said actuator is a step motor.

12. The four-wheel apparatus according to claim 11, wherein the changing speed altering means is composed so as to alter a frequency of a driving pluse for said step motor.

13. The four-wheel apparatus according to claim 1, wherein said sliding state detecting means is composed of a switch of the manually operative type.

14. The four-wheel apparatus according to claim 1, wherein said sliding state detecting means contains a subtracter for generating a signal on the basis of a difference in rotation between the driving wheels and the following wheels.

15. The four-wheel apparatus according to claim 1, wherein said sliding state detecting means is composed so as to generate a signal in accordance with a state of operating a wiper.

16. The four-wheel apparatus according to claim 1, wherein said sliding state detecting means is composed of a judging device for generating a signal in accordance with a vibrations level of a vehicle body.

17. The four-wheel apparatus according to claim 1, wherein said sliding state detecting means contains a comparater for generating a signal in accordance with a magnitude between a signal in response to an outside temperature and a reference signal.

18. The four-wheel apparatus according to claim 1, wherein said sliding state detecting means contains a judging divice for generating a signal in accordance with a frequency level of a skid signal generated from skid controlling means and a comparater for generating a signal in accordance with a magnitude between a signal from said judging device and a reference signal.

19. The four-wheel apparatus according to claim 18 further comprising liquid pressure detecting means for detecting brake pressures to be applied to a brake of the wheels in a continuous manner and switching means for switching a signal from said liquid pressure detecting means so as to pass or interrupt the passage.

20. The four-wheel apparatus according to claim 1, wherein said sliding state detecting means is to detect a sliding state of a road surface in a continuous manner and said changing speed altering means for changing a turning ratio changing speed is to change a speed of changing a rear wheel turning ratio in a continuous manner.

21. The four-wheel apparatus according to claim 1, wherein said changing speed altering means for changing a turning ratio changing speed is to change a speed changing a rear wheel turning ratio is a stepwise manner.

22. The four-wheel apparatus according to claim 2, wherein said turning ratio change controlling means is to allow the changing speed of the rear wheel turning ratio to get larger as a deviation between a target turning ratio and an actual turning ratio gets larger and said changing speed altering means for changing a turning ratio changing speed is to change a maximum value for the changing speed by way of said turning ratio change controlling means.

23. The four-wheel apparatus according to claim 22, wherein said changing speed altering means for changing a turning ratio changing speed is to change said maximum value in a stepwise manner.

* * * * *